United States Patent [19]
Chung

[11] Patent Number: 5,746,380
[45] Date of Patent: May 5, 1998

[54] DEVICE FOR PREVENTING WELDING WIRE IN A WELDING WIRE PAIL FROM TANGLING

[75] Inventor: Mong-Suk Chung, Seoul, Rep. of Korea

[73] Assignee: Hyundai Welding & Metal Col, Ltd., Seoul, Rep. of Korea

[21] Appl. No.: 688,112

[22] Filed: Jul. 29, 1996

[30] Foreign Application Priority Data

Mar. 20, 1996 [KR] Rep. of Korea .................. 5412/96

[51] Int. Cl.$^6$ .................. B65H 55/00; B65H 49/00; C10G 1/08
[52] U.S. Cl. .................. 242/171; 242/129; 242/172; 206/408
[58] Field of Search .................. 242/170, 171, 242/172, 128, 129; 206/389, 408, 409

[56] References Cited

U.S. PATENT DOCUMENTS

| | | | |
|---|---|---|---|
| 2,864,565 | 12/1958 | Wheatley | 242/128 |
| 3,809,333 | 5/1974 | Lefever | 206/409 X |
| 4,869,367 | 9/1989 | Kawasaki et al. | 242/172 X |
| 5,277,314 | 1/1994 | Cooper et al. | 242/172 X |
| 5,374,005 | 12/1994 | Jenkins et al. | 242/171 X |

*Primary Examiner*—Michael Mansen
*Attorney, Agent, or Firm*—Harrison & Egbert

[57] ABSTRACT

A device for preventing wire in a welding wire pail from tangling. Tangle preventing bead packages are laid on the coiled welding wire inside the pail. Pressing pipes vertically stand on the coiled welding wire at portions between the packages. An internal buffer ring is laid on the pressing pipes, while an external buffer ring with two elastic bands is laid on the internal buffer ring. The coiled welding wire in the pail is prevented from jumping, getting tangled or twisting in the pail while the pail is handled or transported. In order to draw the welding wire out of the pail, the pressing pipes and buffer rings are removed from the pail and the packages are torn to uniformly scatter the tangle preventing beads over the coiled welding wire. The welding wire smoothly goes through the beads to be drawn out of the pail without causing any tangling in the wire.

3 Claims, 3 Drawing Sheets

PRIOR ART

1

DEVICE FOR PREVENTING WELDING WIRE IN A WELDING WIRE PAIL FROM TANGLING

BACKGROUND OF THE INVENTION

1. Field of the Invention

The present invention relates in general to a welding wire pail with means for preventing the coiled welding wire from getting tangled while either handling the pail or drawing the welding wire out of the pail. More particularly, the invention relates to an improvement in such wire tangle preventing means for minimizing the contact resistance between the turns of the coiled welding wire during a spiral ascent of the wire turns by naturally filling beads in the gap between the wire turns in the pail, thus smoothly drawing the welding wire out of the pail without causing any tangling in the wire.

2. Description of the Prior Art

As well known to those skilled in the art, welding wire is coiled in a pail and used as an electrode in an automatic or semiautomatic welding operation.

Japanese U.M. Publication No. Sho. 60-7898 discloses a welding wire pail with pressing means. In the above Japanese welding wire pail, an inner tub is concentrically placed inside an outer tub to form an annular space between the two tubs. A welding wire coil formed by coiling the welding wire is received in the annular space between the two tubs. The pressing means provided in the above pail comprises an annular pressing member and an elastic member that are laid on the top of the wire coil. The turns of the coiled wire go through the gap between the inner tub and the annular pressing member to spirally ascend in the pail while the wire is drawn out of the pail. In the above wire pail, the pressing means only presses down the wire coil while the wire turnings go through the gap between the inner tub and the annular pressing member. That is, the above pressing means does not fill the gap between wire turns during a spiral ascent of the wire turns. The pressing means thus neither separates the wire turns from each other nor prevents the wire from getting tangled while the wire is drawn out of the pail. In this regard, the welding wire of the above pail may get tangled while being drawn out of the pail.

SUMMARY OF THE INVENTION

It is, therefore, an object of the present invention to provide a device for preventing welding wire in a pail from tangling in which the above problems can be overcome and which includes a plurality of spherical or polygonal beads uniformly scattered over the coiled welding wire inside the pail. The beads are naturally charged in the gap between the turns of the wire during a spiral ascent of the wire turns, thus allowing the wire to go through them and minimizing the contact resistance between the wire turns and letting the wire be smoothly drawn out of the pail without causing any tangling in the wire.

In order to accomplish the above object, the present invention provides a device for preventing coiled welding wire from getting tangled in a welding wire pail, the coiled welding wire being received in an annular gap formed between inner and outer tubs of the pail, comprising: a plurality of tangle preventing bead packages laid on top of the coiled welding wire, each package packaging a plurality of tangle preventing beads; a plurality of pressing pipes vertically standing on the top of the coiled welding wire at portions between the packages; an internal buffer ring laid on the tops of the pressing pipes; an external buffer ring provided with two elastic bands and laid on the internal buffer ring, the bands being diametrically fitted over the external buffer ring to make a right angle with each other and laid on the top edge of the internal buffer ring to lay the external buffer ring on the internal buffer ring; and a top lid covering the top of the outer tub.

The pressing pipes and buffer rings are removed from the pail and the packages are torn to uniformly scatter the tangle preventing beads over the coiled welding wire prior to drawing the wire out of the pail.

The welding wire smoothly goes through the tangle preventing beads and spirally ascends without causing any interference between the turns of the wire while the wire is drawn out of the pail.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
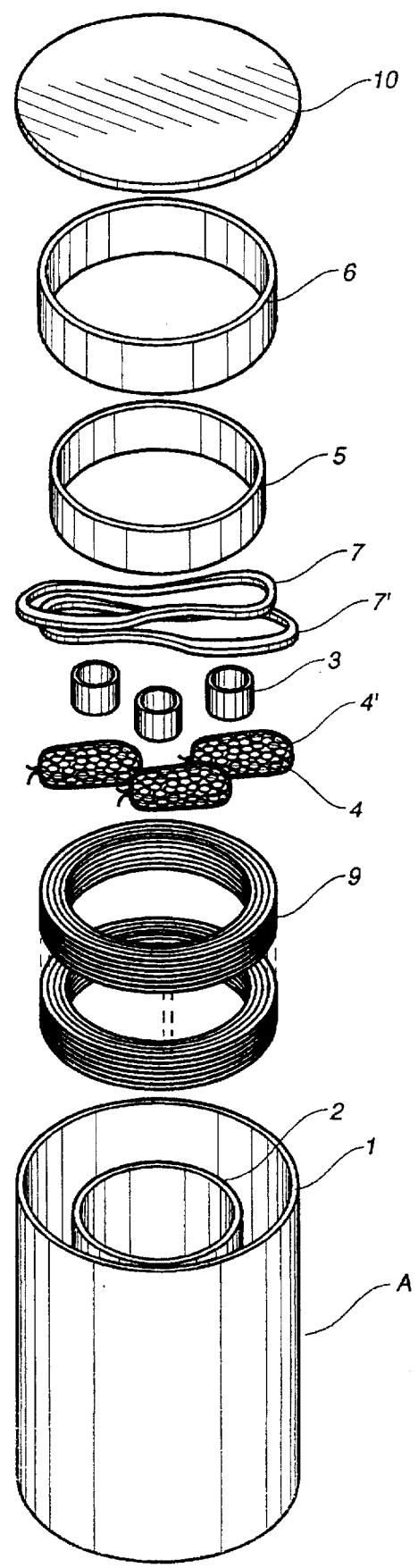
FIG. 1 is an exploded perspective view showing the construction of a welding wire pail with a tangle preventing device in accordance with a preferred embodiment of the present invention.
Figure 2:
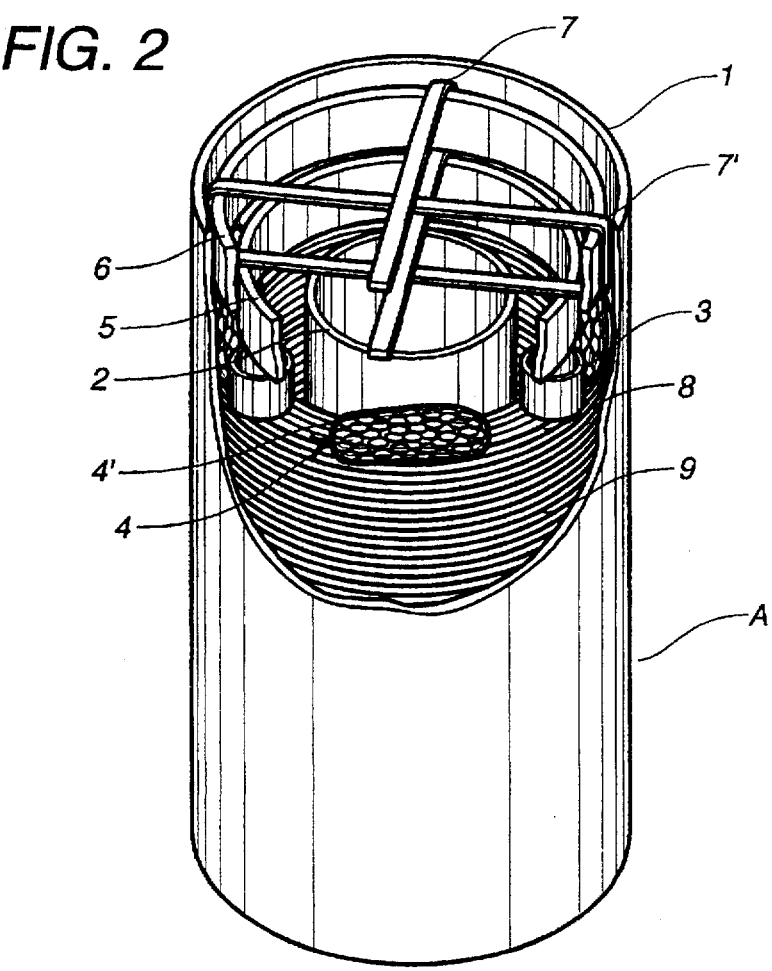
FIG. 2 is a partially broken perspective view of the above pail showing the construction of the tangle preventing device.
Figure 3:
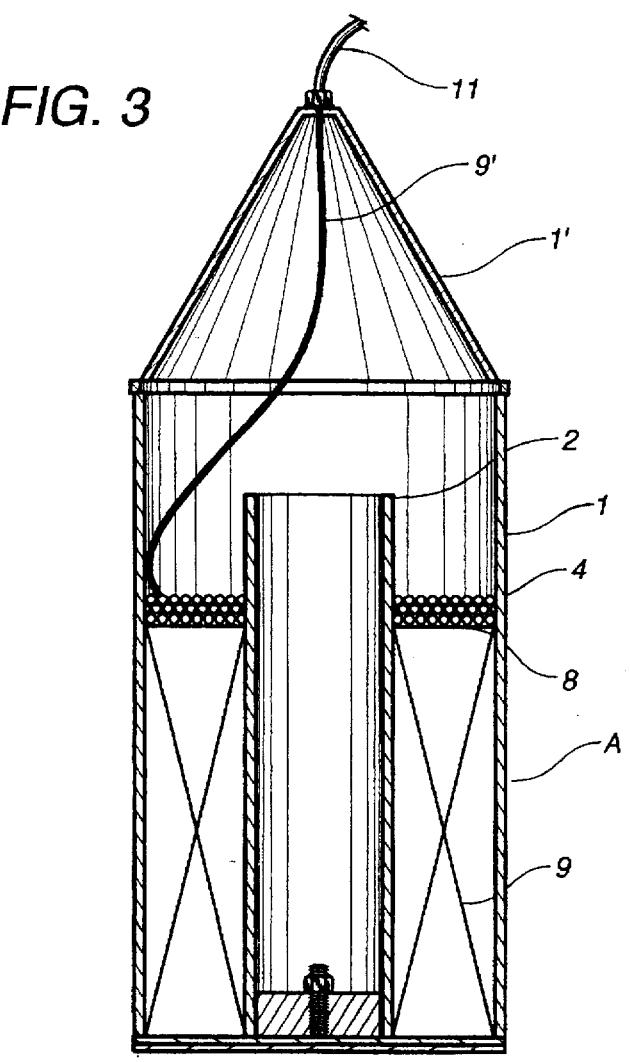
FIG. 3 is a schematic sectional view of the above pail showing the wire coil received in the annular gap between the inner and outer tubs of the pail and the welding wire drawn out of the pail.
Figure 4:
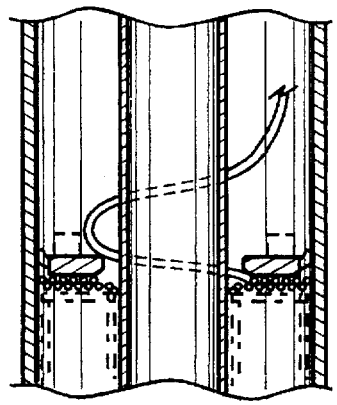
FIG. 4 is a schematic sectional view showing the welding wire drawn out of a typical welding wire pail with pressing means.

FIGS. 1 to 3 show a welding wire pail with a tangle preventing device in accordance with a preferred embodiment of the present invention. As shown in the drawings, a welding wire coil 8, formed by coiling the welding wire 9, is received in the annular gap formed between the outer and inner tubs 1 and 2 of the pail. The tangle preventing device of this invention includes a plurality of tangle preventing bead packages 4' that are laid on the wire coil 8. Each package 4' includes a plurality of tangle preventing beads 4 having spherical or polygonal configurations. A plurality of pressing pipes 3 vertically stand on the top of the wire coil 8 at portions between the packages 4'. The above pipes 3 are spaced out at regular intervals. An internal buffer ring 5 is laid on the tops of the pressing pipes 3. The tangle preventing device also includes an external buffer ring 6 that is elastically laid on the internal buffer ring 5 by two elastic bands 7 and 7'. The two elastic bands 7 and 7' are diametrically fitted over the external ring 6 to make a right angle with each other. When placing the larger-diameter external ring 6 on the small-diameter internal ring 5, the above crossing bands 7 and 7' are laid on the top edge of the internal ring 5. The top of the outer tub 1 is covered with a circular top lid 10.

In the drawings, reference numeral 1' denotes a wire guiding cover fitted over the outer tub 1, the numeral 9' denotes the leading part of the welding wire 9 drawn out of the pail, the numeral 11 denotes a wire guiding tube, and the character A denotes the welding wire pail.

While the pail A is handled or transported, all the bead packages 4', pipes 3 and buffer rings 5 and 6 with the elastic bands 7 and 7' stably press the wire coil 8 down in the pail A, thus preventing the coiled configuration of the wire coil 8 from being deformed by weight leaning, preponderance or impact. Therefore, the coiled welding wire 9 in the pail A is prevented from jumping, getting tangled or twisting while the pail A is handled or transported.

In order to draw the welding wire 9 out of the pail A, the top lid 10 is removed from the outer tub 1 prior to removing both the buffer rings 5 and 6 and the pipes 3 from the top of the wire coil 8. Thereafter, the packages 4' are torn to take the tangle preventing beads 4 out of the packages 4'. The beads 4 in turn are uniformly scattered over the wire coil 8. Thereafter, the cover 1' with the leading part 9' of the welding wire 9 passing through the wire guiding tube 11 is tightly fitted over the top of the outer tub 1. During a welding operation, the welding wire 9 is drawn out of the pail A to be used as an electrode in the welding operation.

When the welding wire 9 is drawn out of the pail A, the wire 9 goes through the tangle preventing beads 4 uniformly scattered over the wire coil 8. The tangle preventing beads 4 in the above state continuously fill the gap between the wire turns in the pail A during a spiral ascent of the wire turns. The beads 4 are thus brought into contact with the wire turns and minimize the contact resistance between the turns during the spiral ascent of the turns in the pail A. In this regard, the beads 4 allow the welding wire 9 to be smoothly drawn out of the pail A without causing any tangling.

In the present invention, it should be understood that there exist various different bead configurations which are suitable to be naturally charged in the gap between the wire turns in the pail A and yield the same result as that described for the preferred embodiment without affecting the functioning of this invention. For example, it is preferred to use weighty beads, such as glass beads, as the tangle preventing beads 4.

The welding wire pail with the tangle preventing device of this invention does not cause any tangling in the wire even though it is not provided with the annular pressing member or the elastic member differently from the typical welding wire pail.

As described above, the present invention provides an improved device for preventing wire in a welding wire pail from tangling. The device of this invention includes a plurality of tangle preventing bead packages laid on top of the coiled welding wire inside the pail. Pressing pipes vertically stand on the top of the coiled welding wire at portions between the packages. An internal buffer ring is laid on the pressing pipes, while an external buffer ring is laid on the internal buffer ring. Two elastic bands are diametrically fitted over the external buffer ring to make a right angle with each other. The crossing bands are laid on the top edge of the internal buffer ring to elastically lay the external buffer ring on the internal buffer ring. The device presses the coiled welding wire down while the pail is handled or transported, thus preventing the coiled welding wire from being deformed. In order to draw the welding wire out of the pail while preventing the wire from getting tangled, the pressing pipes and buffer rings are removed from the pail and the packages are torn to uniformly scatter the tangle preventing beads over the coiled welding wire. The welding wire smoothly goes through the beads in the pail to be drawn out of the pail without causing any tangling in the wire.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for preventing a coiled welding wire from getting tangled in a welding wire pail, said coiled welding wire being received in an annular gap formed between inner and outer tubs of said pail, comprising:

a plurality of tangle preventing bead packages laid on top of said coiled welding wire, each package packaging a plurality of tangle preventing beads;

a plurality of pressing pipes vertically standing on the top of said coiled welding wire at portions between said packages;

an internal buffer ring laid on the tops of said pressing pipes;

an external buffer ring provided with two elastic bands and laid on said internal buffer ring, said bands being diametrically fitted over said external buffer ring to make a right angle with each other and laid on the top edge of said internal buffer ring to lay said external buffer ring on said internal buffer ring; and a top lid covering the top of said outer tub.

2. The device according to claim 1, wherein said tangle preventing beads are spherical glass beads suitable to be naturally charged in the gap between turns of said coiled welding wire.

3. A device for preventing welding wire from getting tangled in a welding wire pail during drawing comprising:

a coiled welding wire received in an annular gap formed between an inner tub and an outer tub in the pail;

a plurality of tangle preventing beads uniformly scattered over said coiled welding wire within said annular gap; and a cover with a wire guiding tube attached thereto, said cover being affixed over said outer tub, said coiled welding wire having a portion extending through said wire guiding tube.

* * * * *